US009817813B2

(12) United States Patent
Faizakof et al.

(10) Patent No.: US 9,817,813 B2

(45) Date of Patent: Nov. 14, 2017

(54) GENERALIZED PHRASES IN AUTOMATIC SPEECH RECOGNITION SYSTEMS

(71) Applicant: GENESYS TELECOMMUNICATIONS LABORATORIES, INC., Daly City, CA (US)

(72) Inventors: Avraham Faizakof, Kfar-Warburg (IL); Amir Lev-Tov, Bat-Yam (IL); David Ollinger, San Francisco, CA (US); Yochai Konig, San Francisco, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 0 days.

(21) Appl. No.: 14/150,628

(22) Filed: Jan. 8, 2014

(65) Prior Publication Data

US 2015/0194149 A1 Jul. 9, 2015

(51) Int. Cl.

| | |
|---|---|
| ***G10L 15/00*** | (2013.01) |
| ***G06F 17/27*** | (2006.01) |
| *G10L 15/19* | (2013.01) |
| *G10L 15/06* | (2013.01) |
| *G10L 15/18* | (2013.01) |
| *G10L 15/193* | (2013.01) |

(52) U.S. Cl.

CPC ...... *G06F 17/2785* (2013.01); *G10L 15/1815* (2013.01); *G10L 15/063* (2013.01); *G10L 15/1822* (2013.01); *G10L 15/19* (2013.01); *G10L 15/193* (2013.01)

(58) Field of Classification Search

None

See application file for complete search history.

(56) References Cited

U.S. PATENT DOCUMENTS 7,412,393 B1 * 8/2008 De Fabbrizio .......... G06F 3/167 704/231

7,421,393 B1 * 9/2008 Di Fabbrizio .......... G10L 15/28 379/88.04

(Continued)

FOREIGN PATENT DOCUMENTS

| | | | |
|---|---|---|---|
| KR | 1020010112995 | A | 12/2001 |
| KR | 1020050086170 | A | 8/2005 |
| WO | 2006037219 | A1 | 4/2006 |

OTHER PUBLICATIONS

Bellman R. E., Dynamic programming, Princeton University Press, pp. 169-199 (1957).

(Continued)

*Primary Examiner* — Marcus T Riley

(74) *Attorney, Agent, or Firm* — Lewis Roca Rothgerber Christie LLP

(57) ABSTRACT

A method for generating a suggested phrase having a similar meaning to a supplied phrase in an analytics system includes: receiving, on a computer system comprising a processor and memory storing instructions, the supplied phrase, the supplied phrase including one or more terms; identifying, on the computer system, a term of the phrase belonging to a semantic group; generating the suggested phrase using the supplied phrase and the semantic group; and returning the suggested phrase.

21 Claims, 19 Drawing Sheets

(56) References Cited

U.S. PATENT DOCUMENTS

| | | | | |
|---|---|---|---|---|
| 7,430,510 | B1 * | 9/2008 | De Fabbrizio | G10L 15/22 379/70 |
| 7,487,094 | B1 * | 2/2009 | Konig | G10L 15/19 379/88.01 |
| 8,160,883 | B2 * | 4/2012 | Lecoeuche | G10L 15/30 379/88.01 |
| 2003/0004719 | A1 * | 1/2003 | Yuschik | G10L 15/1822 704/246 |
| 2006/0041427 | A1 * | 2/2006 | Yegnanarayanan | G10L 15/063 704/235 |
| 2006/0116877 | A1 * | 6/2006 | Pickering | G10L 15/08 704/231 |
| 2008/0189187 | A1 * | 8/2008 | Hao | G06F 17/243 705/26.41 |
| 2009/0055184 | A1 | 2/2009 | Hebert | |
| 2010/0030400 | A1 * | 2/2010 | Komer | G10L 15/26 701/3 |
| 2012/0158399 | A1 * | 6/2012 | Tremblay | G10L 15/063 704/9 |
| 2013/0268260 | A1 * | 10/2013 | Lundberg | G06F 17/28 704/8 |

OTHER PUBLICATIONS

Brown et al., "Class-based n-gram models of natural language" 18 Journal of Computational Linguistics 4, pp. 467-479 (1992).

Lev-Tov, et al. U.S. Appl. No. 13/886,205, filed May 2, 2013, entitled "Fast Out-of-Vocabulary Search in Automatic Speech Recognition Systems", 31 pages.

International Search Report and Written Opinion of the International Searching Authority for patent application No. PCT/US2015/010534, dated Mar. 30, 2015, 12 pages.

Extended European Search Report for Application No. 15735090.1, dated Nov. 30, 2016, 7 pages.

European Patent Office action for Application No. 15 735 090.1, dated Sep. 18, 2017, 5 pages.

* cited by examiner

GENERALIZED PHRASES IN AUTOMATIC SPEECH RECOGNITION SYSTEMS

FIELD

Aspects of embodiments of the present invention relate to the field of speech recognition and performing analytics on the output of an automatic speech recognition (ASR) system. More particularly, aspects of embodiments of the present invention relate to a computer-implemented and assisted system and method for defining semantic groups of terms, defining generalized phrases using the semantic groups, recognizing particular phrases, and classifying recognized phrases using the generalized phrases in an ASR system.

BACKGROUND

Organizations and individuals often record and store audio containing spoken conversations. For example, telephone calls made to a contact center operated by a large organization (e.g., a contact center staffed with agents providing customer support or sales), audio logs from a medical practice (e.g., a surgeon's narration of procedures performed in surgery), recordings of lectures, calls to law enforcement and emergency dispatch services, etc. are all often recorded for training, recordkeeping, and other purposes.

Automatic speech recognition (ASR) systems can be used to process and recognize the recorded or real-time spoken language (speech).

SUMMARY

Aspects of embodiments of the present invention are directed to a system and method for assisting users in utilizing generalized semantic groups of terms to increase the coverage of phrases used to categorize recorded or real-time interactions. Embodiments of the present invention are also directed to systems and methods for automatically generating generalized semantic groups of terms and for improving the efficiency of training automatic speech recognition systems by using generalized semantic groups of terms.

Analyzing (or performing analytics on) interactions with customers, clients, and other users of systems is often used to identify trends and patterns in the behaviors of those users. For example, recorded or real-time spoken interactions (e.g., speech in telephone conversations) in a sales contact center of a company can be analyzed to categorize the calls based on effectiveness of the sales agents (e.g., frequency of success of upsell attempts), to identify customer complaints, or to identify current problems in the system.

Automatic speech recognition (ASR) systems can be used to process these recorded conversations or real time conversations, automatically recognize particular spoken phrases within the recorded speech, and automatically classify the recorded calls into categories based on the presence of particular phrases. For example, conversations containing the phrases "Would you be interested in upgrading your current plan?" or "Can I interest you in our premium offering?" could be classified as conversations containing "upsell attempts." According to one embodiment, the phrases associated with various categories are generated by a user (who may be have expertise in designing such categories) who manually inputs phrases into a system based on their knowledge and experience.

Mapping particular phrases to categories can be a difficult and tedious task, in part because of the wide variety of ways in which any particular concept can be expressed. For example, a customer calling to cancel his or her account might say "I want to cancel my membership", "I want to cancel my account", or "I want to cancel my subscription". In this context, the words "membership," "account," and "subscription" have the same meaning, but three different phrases are entered into the system. Furthermore, some customers may use the word "suspend" in place of "cancel."

In still other circumstances, the same phrase may be uttered, but in the context of different information based on the particular interaction. For example, the phrase "my credit card number is" is usually followed by sixteen numbers which differ from interaction to interaction. As such, embodiments of the present invention also involve automatically detecting similar positions within interactions and generalizing a number of different phrases (e.g., phrases containing different credit card numbers) into a generic phrase that would be recognized as a match for any credit card number.

As such, embodiments of the present invention are directed to systems and methods for assisting users in creating generalized phrases that succinctly capture the scope of possible phrases, thereby reducing the scope of the problem and improving the quality of interaction categorization.

According to one embodiment of the present invention, a method for generating a suggested phrase having a similar meaning to a supplied phrase in an analytics system includes: receiving, on a computer system comprising a processor and memory storing instructions, the supplied phrase, the supplied phrase including one or more terms; identifying, on the computer system, a term of the phrase belonging to a semantic group; generating the suggested phrase using the supplied phrase and the semantic group; and returning the suggested phrase.

The semantic group may be a formal grammar.

The formal grammar may be configured to match one of an amount of money, a date, a time, a telephone number, a credit card number, a social security number, a zip code, and a zip code.

The suggested phrase may correspond to the supplied phrase with the identified term replaced with the formal grammar.

The semantic group may include a plurality of terms.

The identified term may be replaced with a replacement term from the plurality of terms of the semantic group, the replacement term being different from the identified term.

The semantic group may be generated by: computing differences between each of a plurality of phrases generated by an automatic speech recognition engine, each of the phrases including a plurality of terms; grouping the plurality of phrases by similarity; identifying locations of differences between the phrases; and defining a generalized semantic group, the generalized semantic group including terms at the locations of the differences in the phrases.

The identified term maybe replaced with the semantic group including the plurality of terms.

The identified term may be replaced with the semantic group and the suggested phrase may be supplied as training data to a speech recognition system.

The analytics system may be a speech analytics system.

According to one embodiment of the present invention, a system includes: a processor; and a memory, wherein the memory stores instructions that, when executed by the processor, causes the processor to: receive a supplied phrase, the supplied phrase including one or more terms; identify a term of the phrase belonging to a semantic group; generate a suggested phrase using the supplied phrase and the semantic group; and return the suggested phrase.

The semantic group may be a formal grammar.

The formal grammar may be configured to match one of an amount of money, a date, a time, a telephone number, a credit card number, a social security number, a zip code, and a zip code.

The memory may stores instructions to generate the suggested phrase by replacing the identified term in the supplied phrase with the formal grammar.

The semantic group may include a plurality of terms.

The memory may store instructions to replace the identified term with a replacement term from the plurality of terms of the semantic group, the replacement term being different from the identified term.

The memory may store instructions to cause the processor to generate the semantic group generated by: computing differences between each of a plurality of phrases generated by an automatic speech recognition engine, each of the phrases including a plurality of terms; grouping the plurality of phrases by similarity; identifying locations of differences between the phrases; and defining a generalized semantic group, the generalized semantic group including terms at the locations of the differences in the phrases.

The memory may store instructions to cause the processor to replace the identified term with the semantic group including the plurality of terms.

The memory may store instructions to cause the processor to replace the identified term with the semantic group and the suggested phrase may be supplied as training data to a speech recognition system.

The processor and memory may be components of a speech analytics system.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
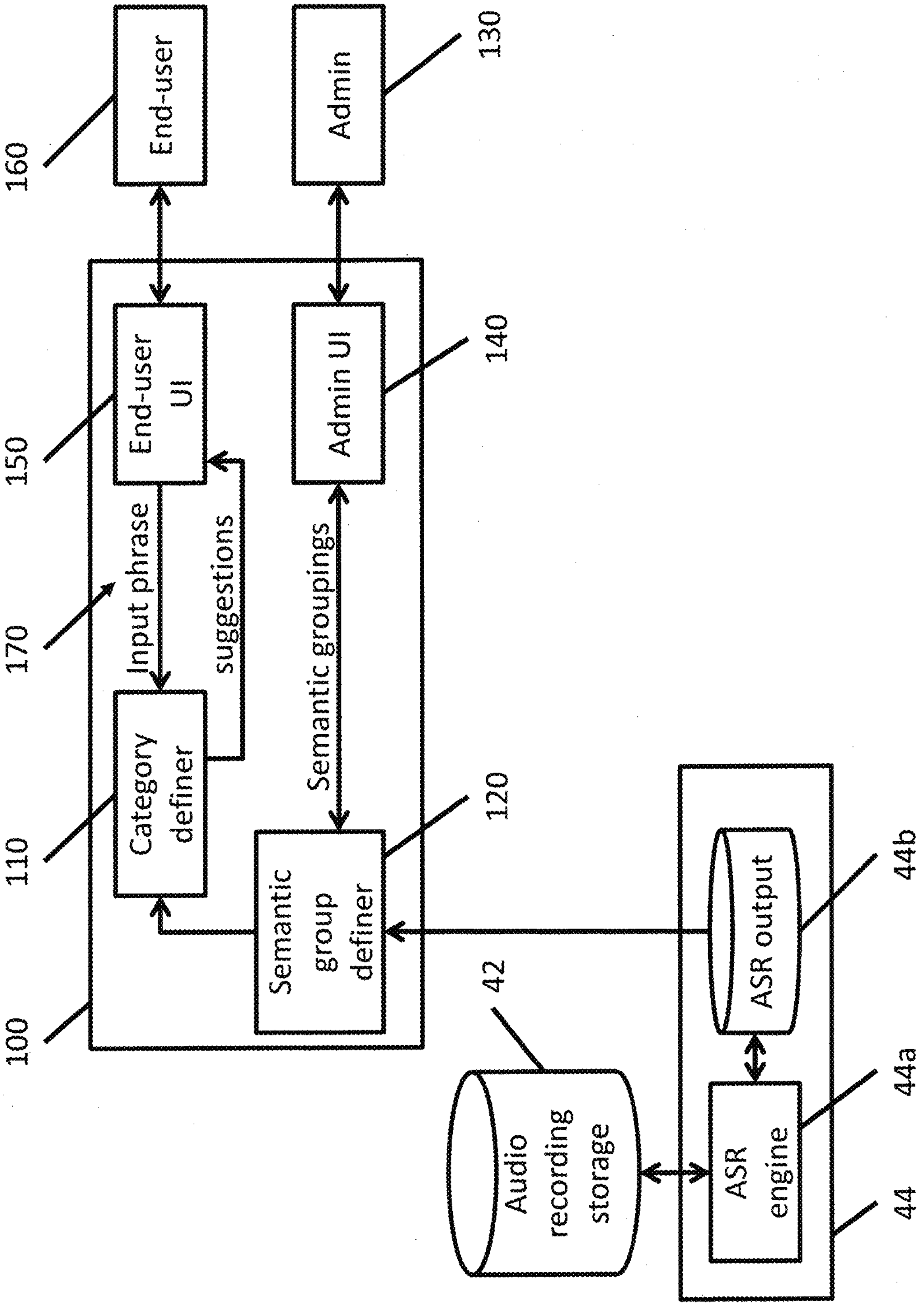
FIG. 1 is a block diagram illustrating a system for managing generalized phrases and providing suggestions or modifications to supplied phrases in accordance with the generalized phrases according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Some embodiments of the present invention will be described in the context of a contact center. However, embodiments of the present invention are not limited thereto and may also be used in under other conditions involving searching recorded audio such as in computer based education systems, voice messaging systems, medical transcripts, or any speech corpora from any source.

Analytics can often be performed on the collection of speech recordings that have been processed by automatic speech recognition systems in order to categorize and automatically detect patterns in the collection of recordings. For example, if a caller says "Where's my order?" or "I haven't received this shipment," then the call is classified as belonging to the "where's my stuff?" topic.

Mapping particular phrases to categories can be a difficult and tedious task, in part because of the wide variety of ways in which any particular concept can be expressed. For example, a customer calling to cancel his or her account might say "I want to cancel my membership", "I want to cancel my account", or "I want to cancel my subscription". In this context, the words "membership," "account," and "subscription" have the same meaning, but three different phrases are entered into the system. Furthermore, some customers may use the word "suspend" in place of "cancel." These additional variations would require the addition of three more phrases to the category in order to list out the various combinations of synonyms.

Generally, automatic speech recognition systems, and in particular large vocabulary continuous speech recognition (LVCSR) transcription engines, include three main components: language models (LM), acoustic models (AM), and a decoder. The LM and AM are trained by supplying audio files and their transcriptions (e.g., transcriptions prepared by a human) to a learning module. Generally, the LM is a Statistical LM (SLM).

In general, systems are used to pre-train a LM using contexts of the domain of interest for a given language and AMs. In practice this can be done by transcribing (manually) a sufficiently large number of audio recordings (e.g., telephone calls in the context of a contact center) and using the textual representation of the conversations as an input for training the LM. As such, the trained LM includes information relating to the frequency with which particular phrases are encountered in the trained domain. For example, a LM trained in the domain of a sales contact center would likely indicate that phrases associated with descriptions of product features, comparisons between products, billing addresses, and order status information appear frequently within the domain. In contrast, such a domain would also likely indicate that phrases related to the recent performance of a baseball team.

After the language model has been trained, the language model can be used to recognize speech. An audio utterance serves as an input to a decoder, which outputs a sequence of recognized words. By doing so for each piece of recorded audio (e.g., each call in a call center, as stored as audio files), the application can index the output in an efficient manner which enables an end user to quickly search the text index (LVCSR index). In one embodiment, LVCSR-based indexes allow for ad-hoc searches essentially without predefining anything.

However, some ASR systems, such as phrase-based recognizers (PR), supply higher accuracy in terms of precision and recall when parts of queries of interest are given in advance see, for example, U.S. Pat. No. 7,487,094 "System and method of call classification with context modeling based on composite words," the entire disclosure of which is incorporated herein by reference and U.S. patent application Ser. No. 13/886,205 "Fast out-of-vocabulary search in automatic speech recognition systems," filed in the U.S. Patent and Trademark Office on May 2, 2013, the entire disclosure of which is incorporated herein by reference. In such systems, the phrases (also referred to as "queries" or "terms") are predefined. The predefined phrases can also be grouped to different topics and categories, so that the recordings (e.g., audio calls or other interactions) can be classified after processing based on whether they contain particular predefined phrases.

In many scenarios, the predefinition is part of a process for customizing the ASR for a specific domain or customer. For example, the process may involve having a person listen to spoken phrases and manually choose important phrases to be added to the system configuration. In the process of selecting phrases to be added to the system configuration, categories can be defined by one or more phrases, where the detection of phrases within a category indicate that the conversation containing the phrase relates to the associated category, thereby allowing the customer to perform analytics on their data.

FIG. 1 is a block diagram illustrating a system 100 according to one embodiment of the present invention for managing generalized phrases and providing suggestions or modifications to supplied phrases in accordance with the generalized semantic groups. The system 100 according to embodiments of the present invention includes a category definer 110, a memory storing a plurality of semantic groups 120, an end-user user interface 150, and an administrator user interface 140.

An administrator 130 may use the administrator user interface 140 to define semantic groupings of terms, as will be described in more detail below. The administrator UI 140 may be implemented in any of a variety of ways as would be understood to a person of ordinary skill in the art. For example, in one embodiment of the present invention, the administrator UI 140 is implemented as a web-based application that presents forms, buttons, and controls to a user via a web page displayed in a web browser used by an administrator 130 and that receives requests from a web browser via HTTP POST and GET operations. However, embodiments of the present invention are not limited thereto. For example, the administrator UI may also be implemented as an application programming interface (API) that is configured to communicate with a dedicated application running on a personal computer, tablet, smartphone, or other end-user computing device. As still another alternative, the administrator UI may receive instructions and requests from an administrator 130 directly through input devices (e.g., a keyboard and mouse) attached directly to the system 100.

The semantic group definer 120 includes a memory configured to store a plurality of mappings of terms to semantic concepts, as will be described in more detail below. In some embodiments of the present invention, the semantic group definer 120 is also configured to analyze data stored in the ASR output **44*b* to automatically generate semantic groups based on the output of an automatic speech recognition system, as will be described in more detail below. The ASR output 44*b* is generated by processing audio recordings stored in audio recording storage 42 through an automatic speech recognition engine 44*a*. The ASR engine 44*a*** can also be used to analyze speech in real-time (e.g., to analyze a call to a call center while the call is in progress).

The system 100 further includes an end-user UI 150 which is configured to receive input from an end user 160 for defining categories based on one or more phrases. The user input may include, for example, the name of a category (e.g., "customer dissatisfaction") and a phrase to be inserted into the category (e.g., "I'm very upset"). The category definer 110 is configured to receive this user input, analyze the input phrase, and may return suggestions to the end user UI 150 to be shown to the end-user 160. The suggestions may be based on semantic groups stored in the semantic group definer 120. The suggestions and methods for generating the suggestions according to various embodiments of the present invention will be described in more detail below.

In some embodiments of the present invention, the end-user UI 150 and the administrator UI 140 may be the same and end-users 160 can perform operations (e.g., defining semantic groups) that are described above as operations performed via the administrator UI 140.

The automatic speech recognition engine 44*a* and the ASR output database 44*b* may be components of a voice analytics module 44. The ASR engine 44*a* is configured to process recorded audio stored in an audio recording storage server 42 (e.g., digital audio files stored in a format such as PCM, WAV, AIFF, MP3, FLAC, OGG Vorbis, etc.) to recognize spoken words (e.g., speech) stored in the recoded audio. In some embodiments, the ASR engine 44*a* is configured to perform real-time analysis of audio. The recognized data is stored in the ASR output database 44*b*.

Figure 2:
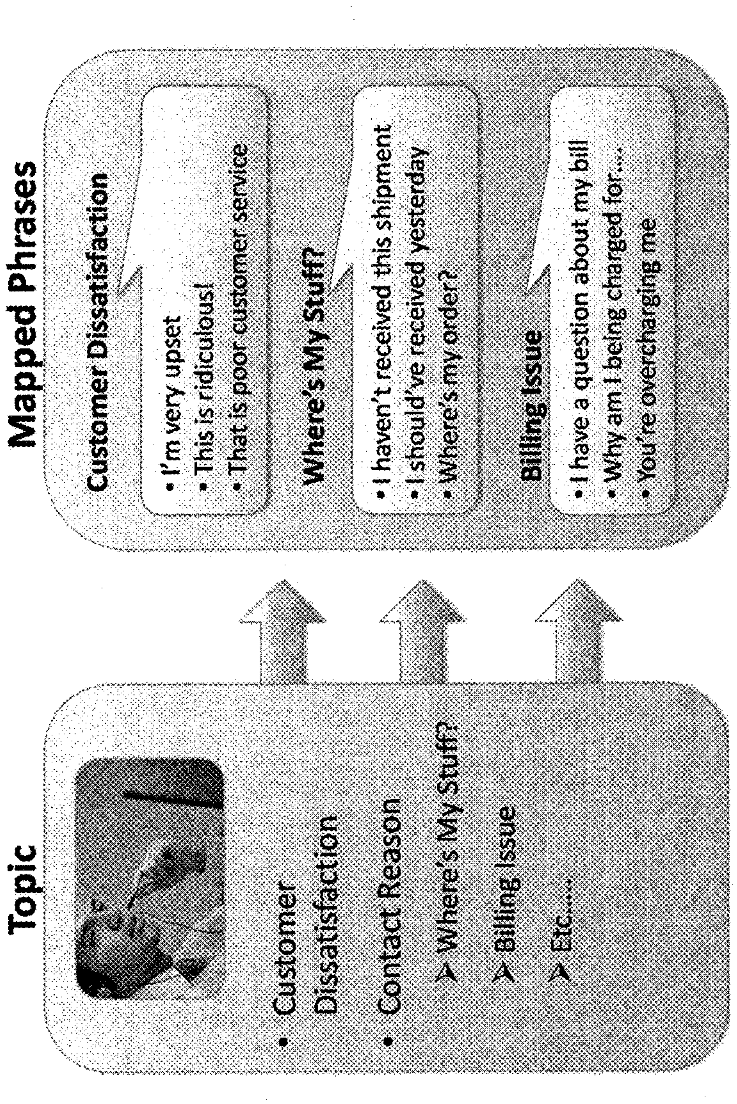
FIG. 2 is an illustration of the mapping of phrases to topics or categories.

As shown in FIG. 2, in one embodiment, each topic is defined as union of phrases. For example, the phrases "I'm very upset", "this is ridiculous", and "that is poor customer service" can be mapped to the category "customer dissatisfaction." Likewise, the phrases "I have a question about my bill", "why am I being charged for", and "you're overcharging me" can be mapped to the category "billing issue." To increase the coverage of the phrases defined within a topic, generalized semantic groups can be used alongside or in place of particular terms (e.g., a word or sequence of words) within phrases.

Figure 3:
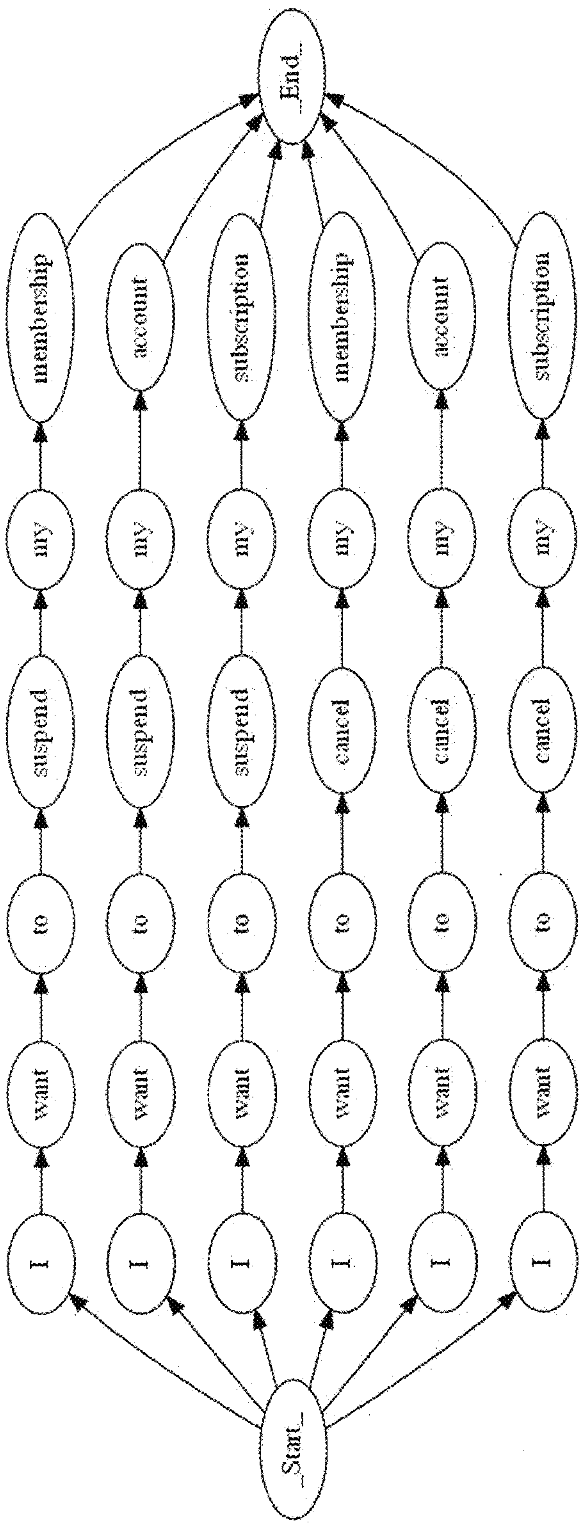
FIG. 3 is a diagram illustrating a category as a non-deterministic finite automaton (NFA) containing six different phrases without grouping according to one embodiment of the present invention.
Figure 4:
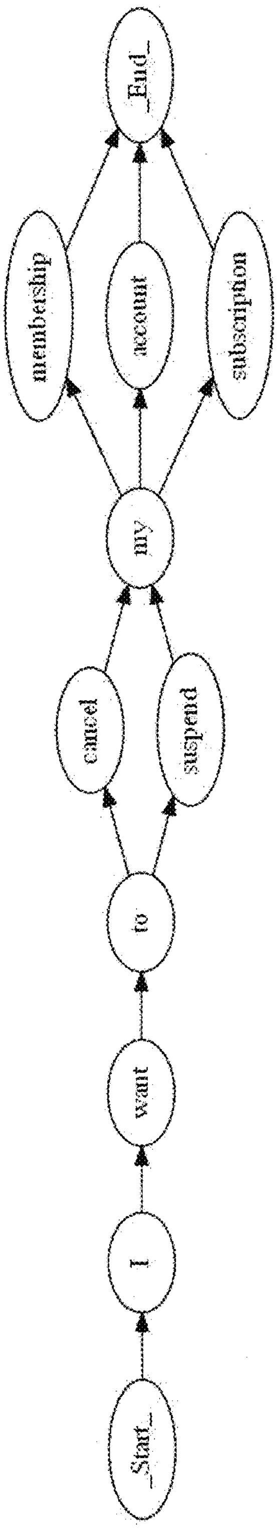
FIG. 4 is a diagram illustrating the category shown in FIG. 3 as a NFA containing the same six phrases with grouping according to one embodiment of the present invention.

Embodiments of the present invention are directed to a system and method that allow a user to group similar words together into a generalized semantic group (or wild card grammar) and use the generalized semantic group in different contexts. According to one embodiment of the present invention, an administrator can define semantic groups by supplying two or more terms where these terms may have the same or equivalent semantic meaning. For example, the words "membership", "account", and "subscription" can be grouped together into a generalized semantic group called "membership_synonyms" (<membership_synonyms>={membership, account, subscription}). As another example, the words "cancel" and "suspend" can be grouped together into the "cancel_synonyms" generalized semantic group (<cancel_synonyms>={cancel, suspend}). FIG. 3 is a diagram illustrating a category as a non-deterministic finite automaton (NFA) containing six different phrases without grouping. FIG. 4 is a diagram illustrating the category shown in FIG. 3 as a NFA containing the same six phrases with grouping according to one embodiment of the present invention. The six phrases shown in FIG. 3 can be grouped together and expressed as "I want to <cancel_synonyms> my <membership_synonyms>" where the semantic groups <cancel_synonyms> and <membership_synonyms> have replaced corresponding words in the original phrases.

In one embodiment, the semantic groups can be stored in a hash table where the name of the group is used as the key and the terms of the group are stored as the values in a list. In some embodiments, a bidirectional mapping is used in which terms are also mapped to semantic groups to allow easy determination of which terms in a phrase belong to a group.

Figure 5:
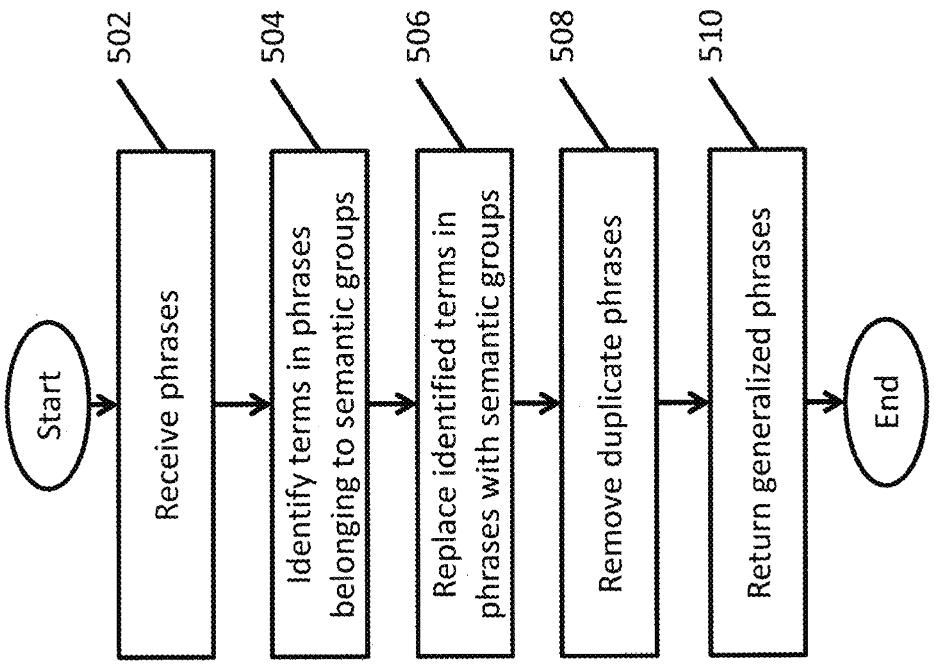
FIG. 5 is a flowchart illustrating a method for grouping together phrases to generate generalized phrases according to one embodiment of the present invention.

FIG. 5 is a flowchart illustrating a method for grouping together phrases to generate generalized phrases according to one embodiment of the present invention. For example, if the six phrases shown in FIG. 2 are supplied to the category definer 110 in operation 502, then, in operation 504, the category definer 110 identifies the differences between the phrases (using, for example, the edit distance algorithm described in Adler et al. "EXCITEMENT—Multilingual Knowledge Acquisition—Cycle I. NICE Systems (Dec. 10, 2012), the entire disclosure of which is incorporated herein by reference), then identifies the words "cancel" and "suspend" as both belonging to the "cancel_synonyms" semantic group. The category definer 110 may also identify the words "membership," "account," and "subscription" as belonging to the "membership_synonyms" semantic group. After identifying the locations of words belonging to the same semantic group, in operation 506, the category definer 110 replaces each instance of the identified term with a reference to the corresponding semantic group (e.g., "suspend" is replaced with "<cancel_synonyms>". In operation 508, the modified phrases are compared and duplicate phrases are removed and the resulting generalized phrases are returned in operation 510. According to one embodiment, the synonyms are detected automatically given that these words share the same context as described in the reference above. For instance, if the system detects "I want to cancel my account" and "I want to terminate my account" (in one embodiment, at least a threshold number of times), then system concludes that "cancel" and "terminate" are synonyms. The group can be named based on, for example, the first word in the group of synonyms "<WORD>_Synonyms", or the most frequent word in a reference text out of all the words in the group "<MOST_FREQUENT_WORD>_Synonyms".

According to another embodiment, the categories can be defined or modified by a human as described above. For instance the user can decide that the word "cancel" will be part of a synonyms group call <CANCEL_SYNONYMS> and then edit this group to add the word "suspend" to it.

Figure 6:
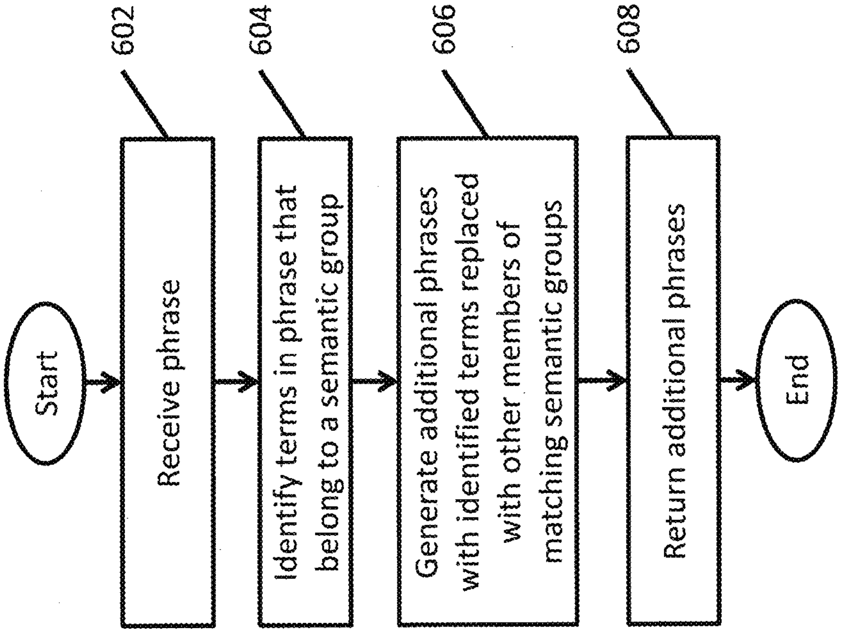
FIG. 6 is a flowchart illustrating a method for identifying additional phrases to add based on a supplied phrase according to one embodiment of the present invention.

Another embodiment of the present invention provides the user with suggestions of additional phrases based on defined generalized semantic groups. FIG. 6 is a flowchart illustrating a method for identifying additional phrases to add based on a supplied phrase according to one embodiment of the present invention. For example, in a context where the "membership_synonyms" group described above already exists, a user defining an "account inquiries" category may supply the phrase "I would like to ask a question about my account" as a phrase mapped to this category. According to one embodiment of the present invention, in operation 602 the category definer 110 receives a phrase and, in operation 604, iterates through the terms in the phrase to identify terms that belong to a semantic group. In this example, the category definer 110 would identify the word "account" belonging to the "membership_synonyms" group. In operation 606, the category definer 110 generates new phrases with the identified terms replaced with the other members of the matching semantic group. Here, the category definer 110 generates the phrases "I would like to ask a question about my membership" and "I would like to ask a question about my subscription" because "membership" and "subscription" are the other terms in the "membership_synonyms" group. The newly generated phrases are then returned in operation 608 as suggestions.

In one embodiment of the present invention, the semantic groups may include groups that are defined so as to include different ways to express concepts such as dates, times, and amounts of money. For example, the semantic groups may be defined as a grammar (or "formal grammar" see, e.g., FIG. 7A for an example of a formal grammar defining an amount of money in dollars and cents). When used in this way, the wild card can efficiently increase the coverage of the supplied phrase. For example, as discussed above, instead of supplying the phrase "the price of the service is four ninety five" a wide range of services with different prices or changing prices can be identified and used to classify an interaction by using the phrase "the price of this service is [currency]" using the [currency] grammar (or wild card) to match any amount of money.

Figure 7A:
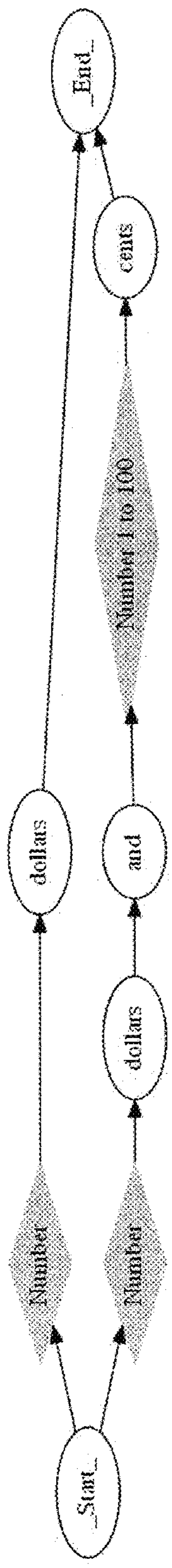
FIG. 7A is a diagram illustrating a grammar for matching an amount of money, as expressed in dollars and cents, according to one embodiment of the present invention.

According to one embodiment of the present invention, the [currency] group is a grammar designed to match a wide range of ways of expressing an amount of money (or a dollar amount) when spoken and may include further grammars embedded within it. FIG. 7A is a diagram illustrating the general structure of a currency formal grammar according to one embodiment of the present invention. According to one embodiment, to recognize dollar amounts from 0 to $1,000 the [currency] grammar includes a parallel grammar where one branch includes a [number] (where a number can be defined by an incorporated grammar for detecting numbers) followed by the word "dollars" and a second branch identifies a number, followed by the phrase "dollars and" followed by another number from 0 to 99 and the word "cents". However, embodiments of the present invention are not limited thereto and many other variations or additions can be made to such a grammar to increase the scope of inputs that can be detected as a currency. In one embodiment, the [number] grammar used within the [currency] grammar also encompasses the various ways in which numbers are expressed when spoken that may not be apparent when written. For example, the [number] grammar can recognize the number 2,200 as expressed as "two thousand two hundred", "twenty two hundred", or "two point two kay". In addition, similar defined grammars can be generated for a wide range of other general concepts, as described below.

Embodiments of the present invention may include a number of defined grammars such as alphanumeric sequences of letters and numbers, credit card expiration dates, credit card numbers, currency, date, digit sequences, numbers, telephone numbers, social security numbers, times, dates, and zip codes. In addition, a generalized "wildcard" grammar can be used to match any "hole" in a phrase. Table 1 lists a few example grammars according to one embodiment of the present invention.

TABLE 1

| Group | Description |
|---|---|
| [alphanum] | Match a sequence of letters and digits, for example spelling of names |
| [ccexpdate] | Match a credit card expiry date, month and year |
| [creditcard] | Match a credit card number |
| [currency] | Match dollar amount, whole dollars and cents |
| [date] | Match dates |
| [digits] | Match any digit sequence |
| [number] | Match ways to naturally write numbers |
| [phone] | Match a phone number |
| [socialsecurity] | Match a Social security number (country dependent) |
| [time] | Time |
| [zipcode] | Match a country dependent zip code |
| [*] | Match anything - simply allow a "hole" in a sentence, where anything can be inserted. |

Figure 7B:
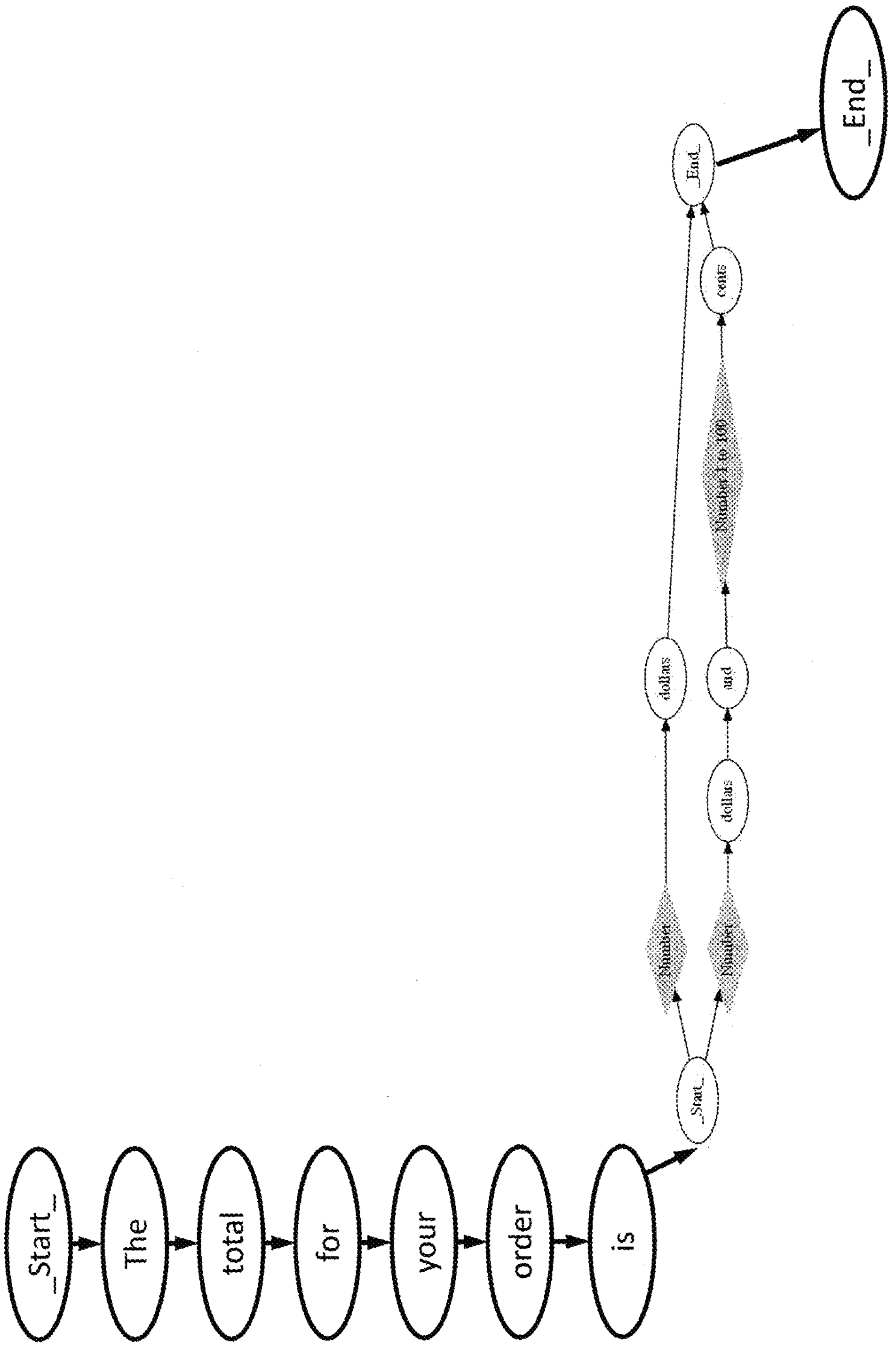
FIG. 7B is a diagram illustrating a grammar for matching a phrase containing an amount of money, according to one embodiment of the present invention.

In embodiments where such a wild cards are used in a phrase, the entire grammar is instantiated in the phrase instead of the original particular terms such that the generalized grammar can be used to match any detected conversation containing the rest of the phrase. FIG. 7B illustrates a phrase "the total for your order is [number]" which incorporates the number grammar shown in FIG. 7B.

Figure 7C:
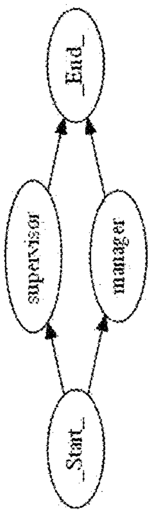
FIG. 7C is a diagram illustrating a generalized semantic group according to one embodiment of the present invention, where the semantic group is illustrated as a NFA.

FIG. 7C is a diagram illustrating a generalized semantic group according to one embodiment of the present invention, where the semantic group is illustrated as a NFA. Here, FIG. 7C illustrates a "supervisor-manager" group that matches either the term "supervisor" or "manager".

Figure 7D:
FIG. 7D is a diagram illustrating a generalized phrase group in which a term is replaced with a generalized semantic group according to one embodiment of the present invention.

FIG. 7D is a diagram illustrating a generalized phrase group in which a term is replaced with a generalized semantic group according to one embodiment of the present invention. Here, the "supervisor-manager" group shown in FIG. 7C appears at the end of the phrase such that the generalized group will match both the phrase "I would like to speak to your supervisor" and the phrase "I would like to speak to your manager".

Although the semantic groups are illustrated and described herein as nondeterministic finite autonoma, embodiments of the present invention are not limited thereto and the semantic groups may be defined using other techniques such as regular expressions.

Figure 7E:
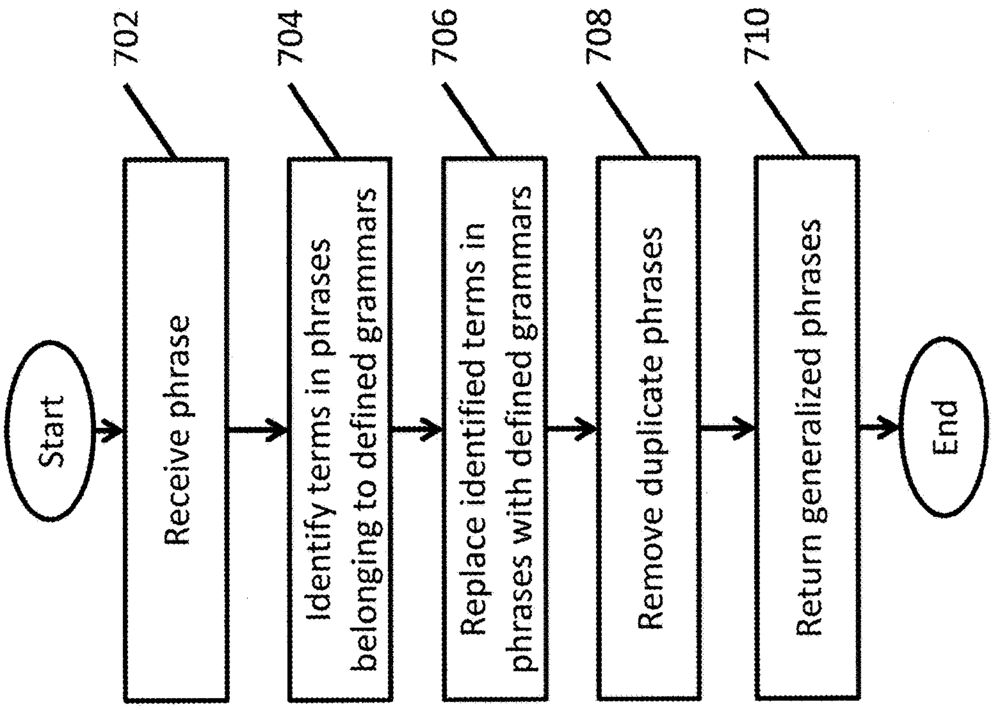
FIG. 7E is a flowchart illustrating a method for replacing particular terms in a phrase with generalized grammars according to one embodiment of the present invention.

FIG. 7E is a flowchart illustrating a method for replacing particular terms in a phrase with generalized grammars according to one embodiment of the present invention. In operation 702, the category definer 110 receives a phrase. In operation 704, terms or groups of terms within the phrase that match a defined grammar are identified. In operation 706 the matching terms are replaced with the defined grammars. In operation 708, if there are multiple phrases, any duplicate phrases are removed, and in operation 710 the remaining, generalized phrases are returned.

Figure 8:
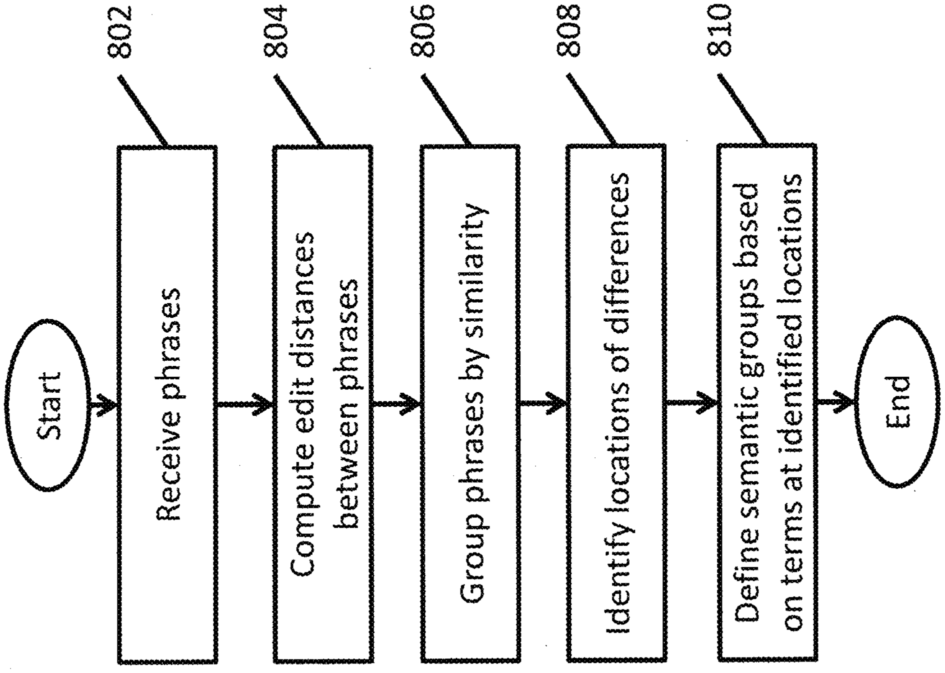
FIG. 8 is a flowchart illustrating a method for analyzing phrases of an ASR output to generate rules.

FIG. 8 is a screenshot of a user interface according to one embodiment of the present invention illustrating the replacement of an identified term with a grammar.

According to one embodiment of the present invention, identified phrases have a prior probability corresponding to the likelihood that they will be found. As such, when grouping phrases using groups (or "wild cards"), the new generalized phrase will have a prior probability which is the sum of the prior probabilities of finding the original phrases. For example, if "suspend" has prior probability of A and "terminate" has a prior probability of B, then the combined prior probability of the generalized phrase (<"terminate" "suspend">) will have a prior probability of A+B.

In still another embodiment of the present invention, a rule matching algorithm automatically detects that two or more phrases are similar, generates a rule for uniting these phrases, and unites the similar phrases into a generalized phrase. According to one embodiment of the present invention, a matching algorithm utilizing dynamic programming can be used to match two phrases and identify places where the phrases are different, thereby enabling automatically generating a new rule that groups the different words (e.g., "manager" and "supervisor" in the example above) that can be suggested to the user for editing (e.g., to add or remove terms that should not be in the rule) and approval or rejection.

FIG. 8 is a flowchart illustrating a method for analyzing phrases of an ASR input to generate rules. In operation 802, the semantic group definer 120 receives phrases, where the phrases are the input of an automatic speech recognition engine. The semantic group definer 120 then computes the edit distance between every pair of phrases in the supplied phrases in operation 804. In operation 806 the phrases are grouped together based on similarity and, in operation 808, locations of differences between the phrases are identified. The semantic group definer 120 then extracts the terms at the locations of the differences between similar phrases and generates a new group containing those differences in operation 810. In one embodiment, false positives (e.g., antonyms) can be edited out of the automatically generated synonyms by a user.

In addition, embodiments of the present invention may be used to suggest that parts of the sentence are already contained in a wild card grammar so that the user can choose to use the grammar instead in this part of the sentence. In this embodiment, every new phrase is matched against existing wild card grammars (using, for example, dynamic programming to improve performance) as it is entered into the user interface. Such an algorithm allows for insertions at the beginning and end of the phrase, so that words that exist in the new phrase, but that are not in the existing grammar, do not prevent a match when only a part of the phrase matches. Table 2 illustrates the output of a matching process between an input phrase and a grammar.

TABLE 2

| Phrase | Match |
|---|---|
| The | Insertion |
| Price | Insertion |
| Of | Insertion |
| This | Insertion |
| Product | Insertion |
| Is | Insertion |
| Four | [currency] |
| ninety | [currency] |
| five | [currency] |

According to one embodiment of the present invention, the wildcard grammars can be used to replace phrases during training of the automatic speech recognition system (e.g., a large vocabulary continuous speech recognition (LVCSR) engine). Generally, training such a system involves supplying a large set of sequences of words (referred to as "n-grams" or "ngrams") that exist in the language in order to train the engine on how commonly particular sequences appear. One downside is that large amounts of training material must be collected to cover as much of the language as possible. Therefore, by replacing particular phrases within the training data with generalized phrases, the effective amount of training material can be increased.

For example, if the training data included the phrases "your flight is on the twelfth of October" and "your flight is on the fourth of June" then the dates could be replaced by the date grammar and the underlying engine can be trained on the phrase "your flight is on the [date]". As such, the generalized training material can be used for recognizing date. Inserting these grammars transforms the single sample that only covers a single date to a general sentence that covers all possible dates.

See, for example, Brown et al. "Class-based n-gram models of natural language" 18 Journal of Computational Linguistics 4 467-79 (1992), the entire disclosure of which is incorporated herein by reference, for a discussion of treating wildcard data as a specific class language model.

As such, embodiments of the present invention can improve the scope of coverage of phrases and can assist users in defining comprehensive coverage of categories.

Figure 9A:
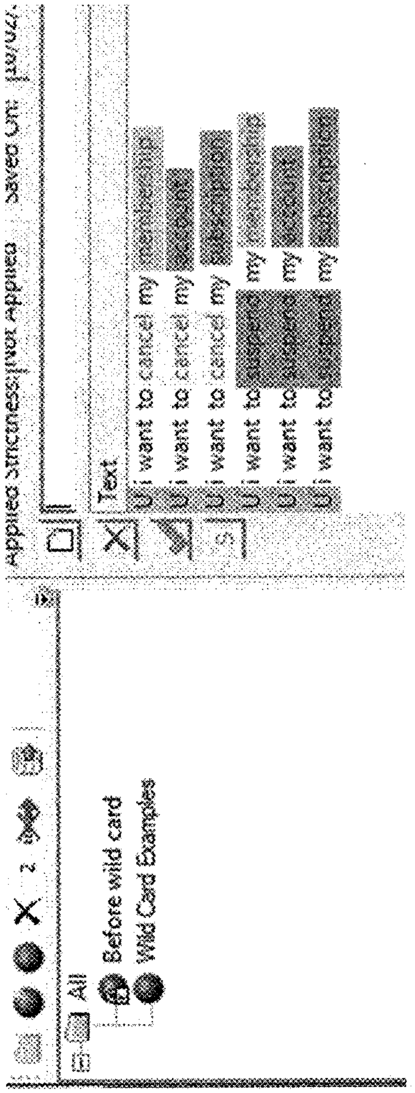
FIG. 9A is a screenshot illustrating a user interface in which the phrases of a category are not grouped.
Figure 9B:
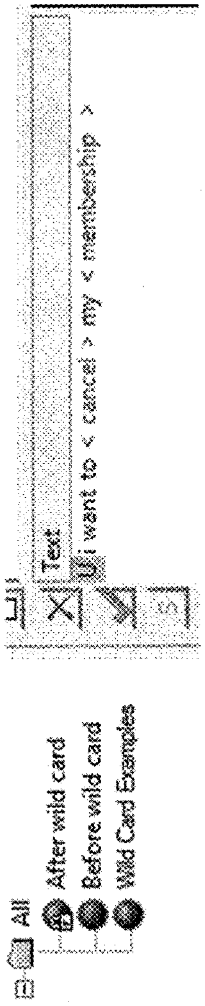
FIG. 9B is a screenshot illustrating a user interface according to one embodiment of the present invention in which the phrases are grouped.

FIG. 9A is a screenshot illustrating a user interface showing a category in which the phrases are not grouped, where the user interface shows the six different phrases (compare with the diagram shown in FIG. 2). FIG. 9B is a screenshot illustrating a user interface where the phrases are grouped where "<cancel>" stands in for the "cancel_synonyms" and "<membership>" stands in for the "membership_synonyms" (compare with the diagram shown in FIG. 3).

Figure 10A:
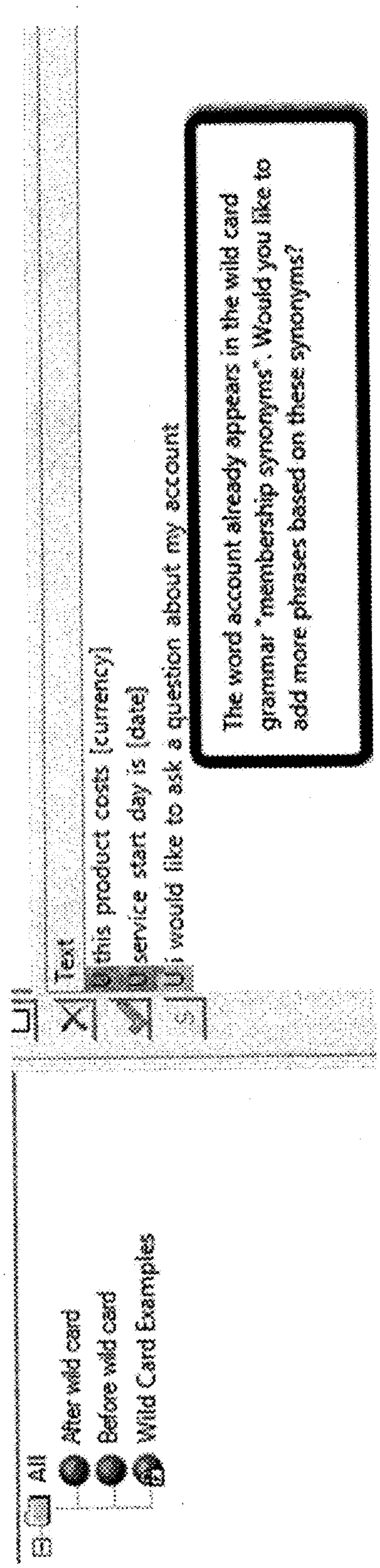
FIG. 10A is a screenshot of a user interface illustrating a system according to one embodiment of the present invention indicating that additional phrases can be added based on the user adding the phrase "i would like to ask a question about my account" to the current category.

FIG. 10A is a screenshot of a user interface illustrating a system indicating that additional phrases can be added based on the user adding the phrase "i would like to ask a question about my account" to the current category. In this example, the system suggests that the word "account" already appears in the semantic group (or "wild card grammar") "membership_synonyms" and offers to automatically add more phrases based on the known synonyms.

Figure 10B:
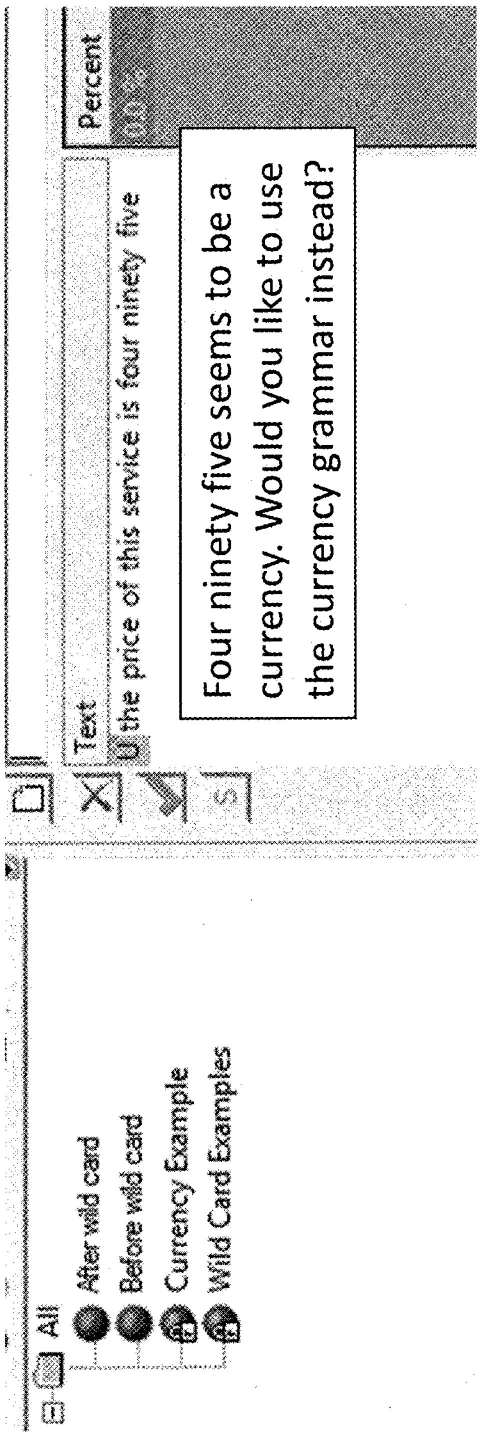
FIG. 10B is a screenshot of a user interface illustrating a system according to one embodiment of the present invention indicating that an entire synonym rule can be added based on the user adding the phrase "the price of this service is four ninety five" to the current category.

FIG. 10B is a screenshot of a user interface illustrating a system indicating that an entire synonym rule can be added based on the user adding the phrase "the price of this service is four ninety five" to the current category. Here, the words "four ninety five" are detected as a potential currency and the system may suggest replacing the words with the currency grammar. In this way, generalizing phrases can be useful when dealing with elements of phrases that vary from interaction to interaction.

Figure 10C:
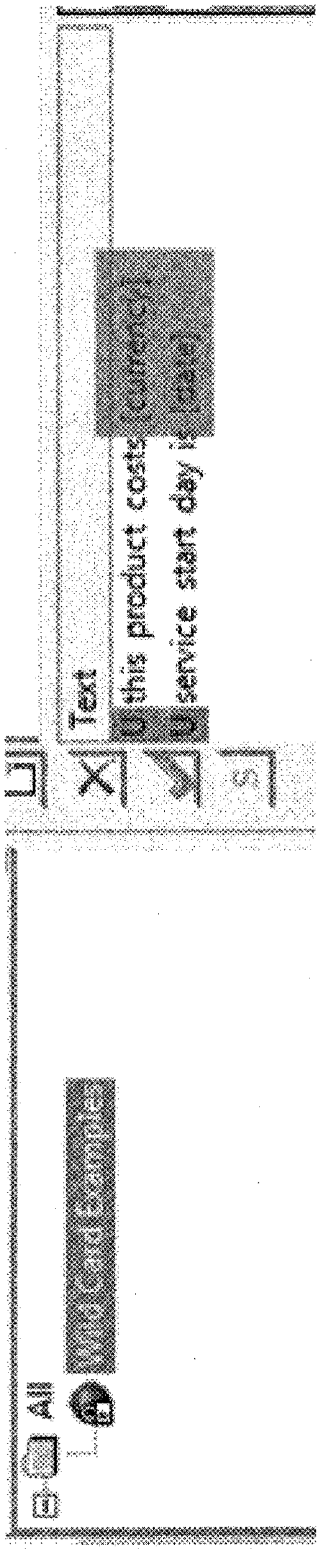
FIG. 10C is a screenshot of a user interface illustrating a system according to one embodiment of the present invention indicating example wild card groups.

FIG. 10C is a screenshot of a user interface illustrating a system according to one embodiment of the present invention after a term detected as a grammar has been replaced with the semantic group. Here, the grammars [currency] and [date] have replaced terms that were previously entered, such as "$19.99" and "July 3rd, 2013" respectively.

Embodiments of the present invention can be applied to both large vocabulary continuous speech recognition (LVCSR) based automatic speech recognition systems and phrase recognition (PR) automatic speech recognition (ASR) systems.

Embodiments of the present invention can be applied in a variety of different fields involving recorded audio conversations, including: talk radio recordings; airborne and naval traffic communications; law enforcement, fire, and emergency communications, etc. According to one embodiment of the present invention the call analytics system is implemented in a contact center in which agents conduct telephone and other voice communications with clients, customers, and other individuals.

Figure 11:
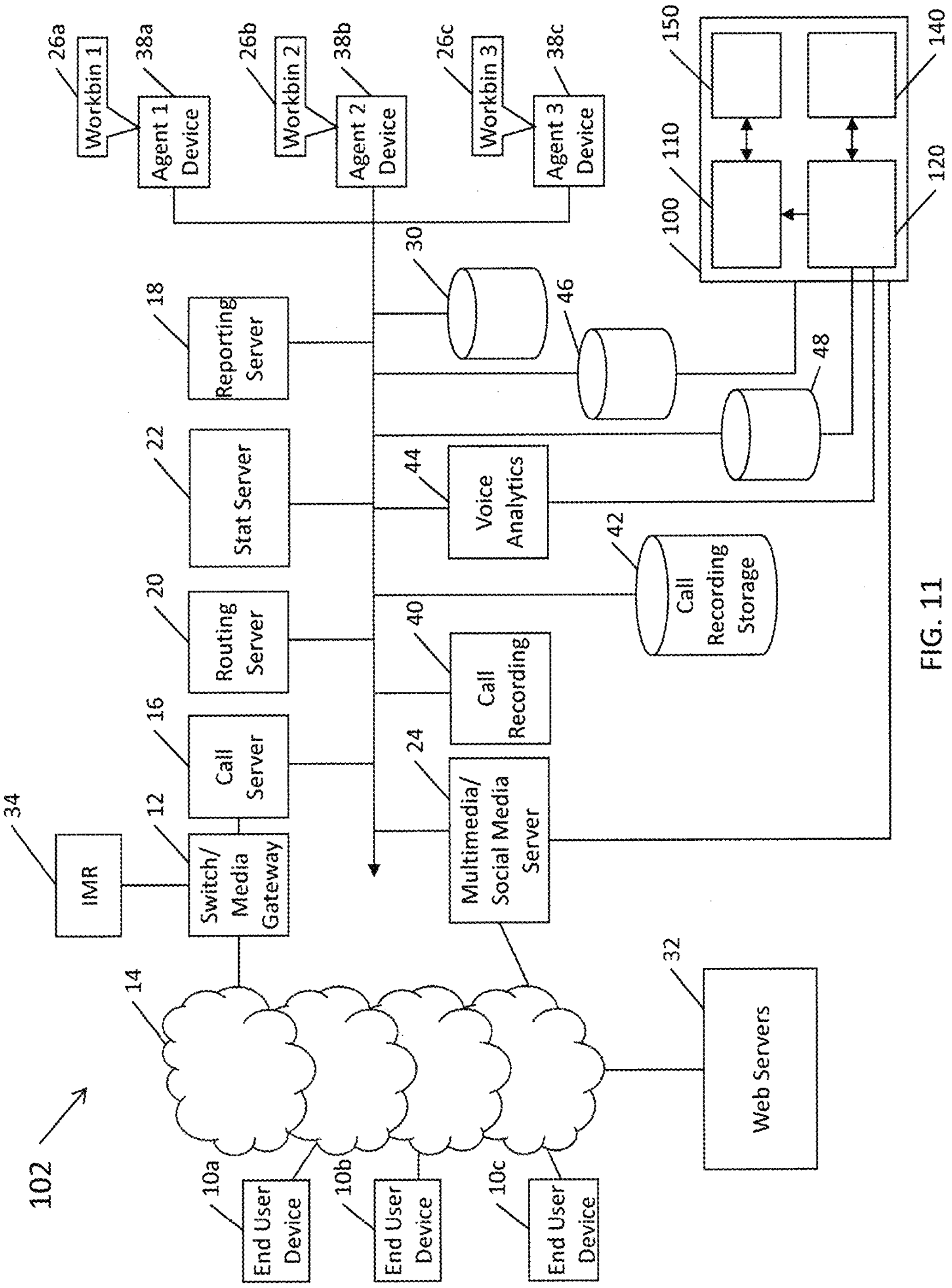
FIG. 11 is a schematic block diagram of a system supporting a contact center that is configured to provide access to recorded audio conversations according to one exemplary embodiment of the invention.

FIG. 11 is a schematic block diagram of a system supporting a contact center that is configured to provide customer availability information to customer service agents according to one exemplary embodiment of the invention. The contact center may be an in-house facility to a business or corporation for serving the enterprise in performing the functions of sales and service relative to the products and services available through the enterprise. In another aspect, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound calls to the contact center via their end user devices 10*a*-10*c* (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one exemplary embodiment of the invention, the switch is coupled to a call server 18 which may, for example, serve as an adapter or interface between the switch and the remainder of the routing, monitoring, and other call-handling components of the contact center.

The contact center may also include a multimedia/social media server for engaging in media interactions other than voice interactions with the end user devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, the switch is coupled to an interactive media response (IMR) server 34, which may also be referred to as a self-help system, virtual assistant, or the like. The IMR server 34 may be similar to an interactive voice response (IVR) server, except that the IMR server is not restricted to voice, but may cover a variety of media channels including voice. Taking voice as an example, however, the IMR server may be configured with an IMR script for querying calling customers on their needs. For example, a contact center for a bank may tell callers, via the IMR script, to "press 1" if they wish to get an account balance. If this is the case, through continued interaction with the IMR, customers may complete service without needing to speak with an agent. The IMR server 34 may also ask an open ended question such as, for example, "How can I help you?" and the customer may speak or otherwise enter a reason for contacting the contact center. The customer's response may then be used by the routing server 20 to route the call to an appropriate contact center resource.

If the call is to be routed to an agent, the call is forwarded to the call server 18 which interacts with a routing server 20 for finding an appropriate agent for processing the call. The call server 18 may be configured to process PSTN calls, VoIP calls, and the like. For example, the call server 18 may include a session initiation protocol (SIP) server for processing SIP calls. According to some exemplary embodiments, the call server 18 may, for example, extract data about the customer interaction such as the caller's telephone number, often known as the automatic number identification (ANI) number, or the customer's internet protocol (IP) address, or email address.

In some embodiments, the routing server 20 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, and SQLite, and may be stored in a mass storage device 30. The routing server 20 may query the customer information from the customer database via an ANI or any other information collected by the IMR 34 and forwarded to the routing server by the call server 18.

Once an appropriate agent is available to handle a call, a connection is made between the caller and the agent device 38*a*-38*c* (collectively referenced as 38) of the identified agent.

Collected information about the caller and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via voice and other multimedia communication mechanisms.

The selection of an appropriate agent for routing an inbound call may be based, for example, on a routing strategy employed by the routing server 20, and further based on information about agent availability, skills, and other routing parameters provided, for example, by a statistics server 22.

The contact center may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one exemplary embodiment of the invention, the routing server 20 is enhanced with functionality for managing back-office/offline activities that are assigned to the agents. Such activities may include, for example, responding to emails, responding to letters, attending training seminars, or any other activity that does not entail real time communication with a customer. Once assigned to an agent, an activity an activity may be pushed to the agent, or may appear in the agent's workbin 26*a*-26*c* (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one exemplary embodiment of the invention, the mass storage device(s) 30 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be provided by a third party database such as, for example, a third party customer relations management (CRM) database. The mass storage device may take form of a hard disk or disk array as is conventional in the art.

According to one embodiment of the present invention, the contact center 102 also includes a call recording server 40 for recording the audio of calls conducted through the contact center 102, an audio recording storage server 42 (also referred to as a call recording storage server in the context of a call center) for storing the recorded audio, a speech analytics server 44 configured to process and analyze audio collected in the form of digital audio from the contact center 102, a speech index database 46 for providing an index of the analyzed audio, and a reference transcripts (or true transcripts) database 48 for storing and providing a collection of transcripts of recorded calls, where the transcripts were generated or proofed and corrected for accuracy (e.g., through manual review or transcription by a human).

The speech analytics server 44 may be coupled to (or may include) a category definition server 100 including a semantic group definer 120, a category definer 110, an administrator user interface 140 for configuring the semantic groupings 110, and an end-user user interface 150 for receiving phrases and category definitions and returning suggestions and/or generalized phrases.

The various servers of FIG. 11 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the term interaction is used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

The various servers of FIG. 11 can be located on-site at the same physical location as the agents of the contact center or may be located off-site (or in the cloud) in a geographically different location, e.g., in a remote data center, connected to the contact center via a network such as the Internet. In addition, some of the servers may be located on-site at the contact center while others may be located off-site, or servers providing redundant functionality may be provided both on-site and off-site to provide greater fault tolerance. In some embodiments of the present invention, functionality provided by servers located off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Each of the various servers in the contact center may be a process or thread, running on one or more processors, in one or more computing devices 500 (e.g., FIG. 12A, FIG. 12B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers and other modules.

Each of the various servers, controllers, switches, and/or gateways in the afore-described figures may be a process or thread, running on one or more processors, in one or more computing devices 1500 (e.g., FIG. 12A, FIG. 12B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

Figure 12A:
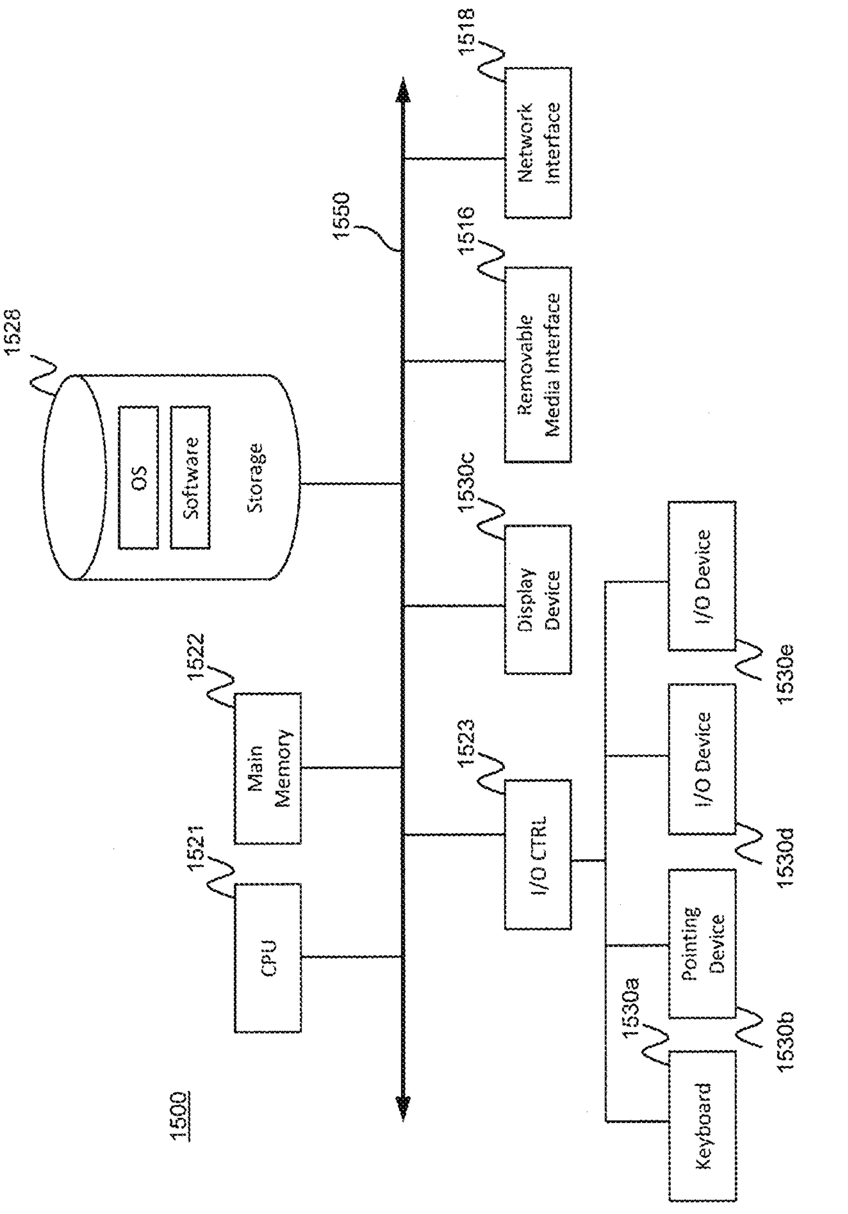
FIG. 12A is a block diagram of a computing device according to an embodiment of the present invention.
Figure 12B:
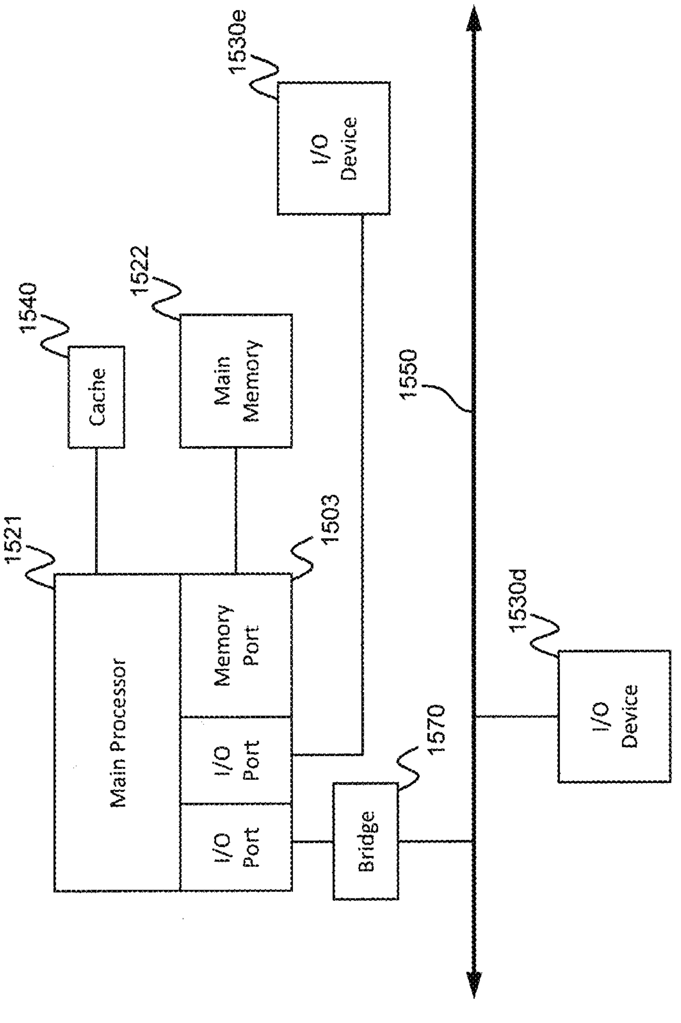
FIG. 12B is a block diagram of a computing device according to an embodiment of the present invention.

FIG. 12A and FIG. 12B depict block diagrams of a computing device 1500 as may be employed in exemplary embodiments of the present invention. Each computing device 1500 includes a central processing unit 1521 and a main memory unit 1522. As shown in FIG. 12A, the computing device 1500 may also include a storage device 1528, a removable media interface 1516, a network interface 1518, an input/output (I/O) controller 1523, one or more display devices 1530*c*, a keyboard 1530*a* and a pointing device 1530*b*, such as a mouse. The storage device 1528 may include, without limitation, storage for an operating system and software. As shown in FIG. 12B, each computing device 1500 may also include additional optional elements, such as a memory port 1503, a bridge 1570, one or more additional input/output devices 1530*d*, 1530*e* and a cache memory 1540 in communication with the central processing unit 1521. The input/output devices 1530*a*, 1530*b*, 1530*d*, and 1530*e* may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 12A, the central processing unit 1521 communicates with the main memory 1522 via a system bus 1550. As shown in FIG. 12B, the central processing unit 1521 may also communicate directly with the main memory 1522 via a memory port 1503.

FIG. 12B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 12A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530*c*, the central processing unit 1521 may communicate with the display device 1530*c* through an Advanced Graphics Port (AGP). FIG. 12B depicts an embodiment of a computer 1500 in which the central processing unit 1521 communicates directly with I/O device 1530*e*. FIG. 12B also depicts an embodiment in which local busses and direct communication are mixed: the central processing unit 1521 communicates with I/O device 1530*d* using a local system bus 1550 while communicating with I/O device 1530*e* directly.

A wide variety of I/O devices 1530 may be present in the computing device 1500. Input devices include one or more keyboards 1530*a*, mice, trackpads, trackballs, microphones, and drawing tablets. Output devices include video display devices 1530*c*, speakers, and printers. An I/O controller 1523, as shown in FIG. 12A, may control the I/O devices. The I/O controller may control one or more I/O devices such as a keyboard 1530*a* and a pointing device 1530*b*, e.g., a mouse or optical pen.

Referring again to FIG. 12A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530*c*, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect or otherwise use the display devices 1530*c*. In one embodiment, a video adapter may comprise multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 12A and FIG. 12B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 12D:
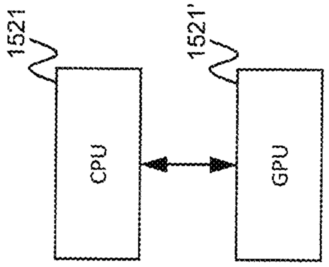
FIG. 12D is a block diagram of a computing device according to an embodiment of the present invention.
Figure 12C:
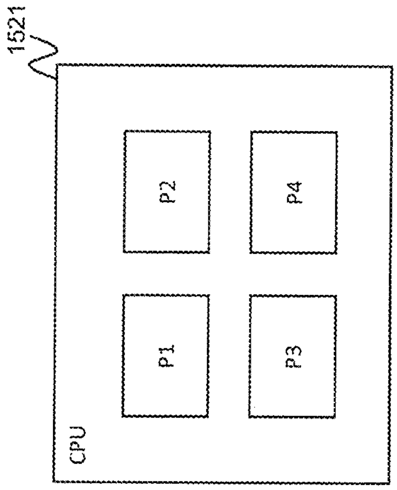
FIG. 12C is a block diagram of a computing device according to an embodiment of the present invention.

As shown in FIG. 12C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 12D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 12E:
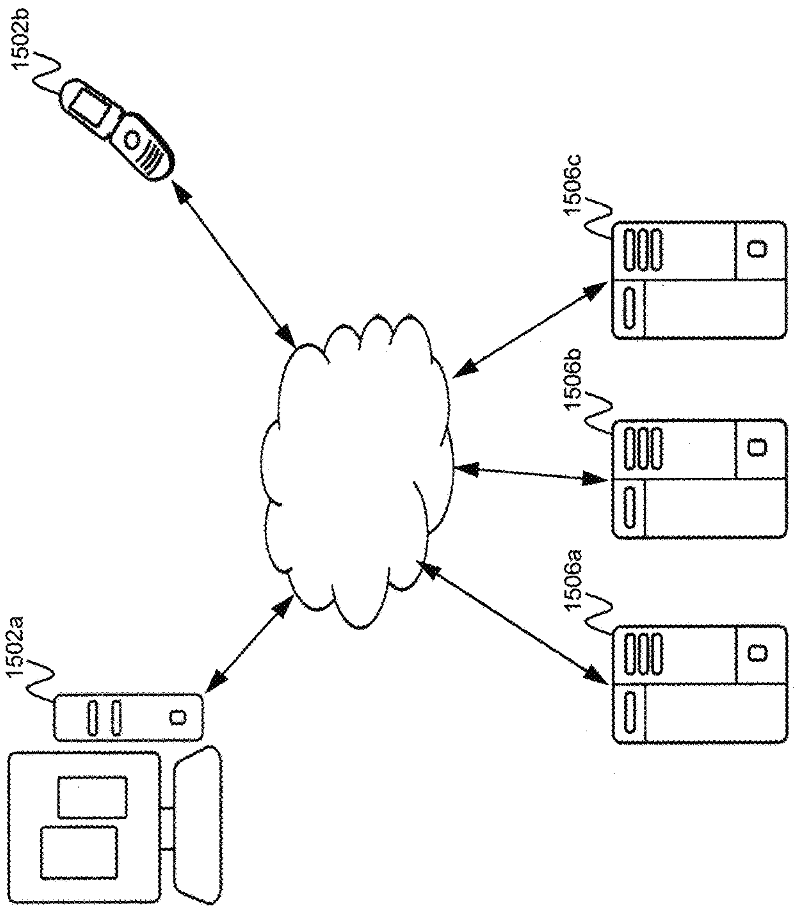
FIG. 12E is a block diagram of a network environment including several computing devices according to an embodiment of the present invention.

A computing device may be one of a plurality of machines connected by a network, or it may comprise a plurality of machines so connected. FIG. 12E shows an exemplary network environment. The network environment comprises one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 12E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method comprising:

receiving, on a computer system comprising a processor and memory storing instructions, a supplied phrase, the supplied phrase comprising one or more terms, the supplied phrase being associated with a category of a plurality of categories, each category being associated with a different topic and a plurality of phrases each having a meaning semantically related to the different topic, the plurality of categories being used by an analytics system to perform classifications;

examining one or more terms included in the supplied phrase;

based on examining the one or more terms, determining that a first term of the supplied phrase corresponds to a semantic group;

identifying a second term that is included in the semantic group;

generating, using the supplied phrase and the second term, a suggested phrase having a similar meaning to the supplied phrase, the suggested phrase and the supplied phrase being semantically related to the different topic associated with the category; and adding the suggested phrase to the category that includes the supplied phrase.

2. The method of claim 1, wherein the semantic group is a formal grammar.

3. The method of claim 2, wherein the formal grammar is configured to match one of an amount of money, a date, a time, a telephone number, a credit card number, a social security number, or a zip code.

4. The method of claim 2, wherein the suggested phrase corresponds to the supplied phrase with the first term replaced with the formal grammar.

5. The method of claim 1, wherein the semantic group comprises a plurality of terms, and wherein the first term is replaced with the second term from the plurality of terms of the semantic group, the second term being different from the first term.

6. The method of claim 5, wherein the semantic group is generated by:

computing differences between each of a plurality of phrases generated by an automatic speech recognition engine, each of the plurality of phrases comprising a plurality of terms;

grouping the plurality of phrases by similarity;

identifying locations of differences between the plurality of phrases; and defining a generalized semantic group, the generalized semantic group comprising terms at the locations of the differences between the plurality of phrases.

7. The method of claim 5, wherein the second term corresponds to the semantic group comprising the plurality of terms.

8. The method of claim 1, wherein the suggested phrase is supplied as training data to a speech recognition system.

9. The method of claim 1, wherein the analytics system is a speech analytics system.

10. A system comprising:

a processor; and a memory, wherein the memory stores instructions that, when executed by the processor, causes the processor to:

receive a supplied phrase, the supplied phrase comprising one or more terms, the supplied phrase being associated with a category of a plurality of categories, each category being associated with a different topic and a plurality of phrases each having a meaning semantically related to the different topic, the plurality of categories being used by an analytics system to perform classifications;

examine one or more terms included in the supplied phrase;

based on examining the one or more terms, determine that a first term of the supplied phrase corresponds to a semantic group;

identify a second term that is included in the semantic group;

generate, using the supplied phrase and the second term, a suggested phrase having a similar meaning to the supplied phrase, the suggested phrase and the supplied phrase being semantically related to the different topic associated with the category; and configure the analytics system by adding the suggested phrase to the category that includes the supplied phrase.

11. The system of claim 10, wherein the semantic group is a formal grammar.

12. The system of claim 11, wherein the formal grammar is configured to match one of an amount of money, a date, a time, a telephone number, a credit card number, a social security number, or a zip code.

13. The system of claim 11, wherein the memory stores instructions to generate the suggested phrase by replacing the first term in the supplied phrase with the formal grammar.

14. The system of claim 10, wherein the semantic group comprises a plurality of terms, and wherein the memory stores instructions to replace the first term with the second term from the plurality of terms of the semantic group, the second term being different from the first term.

15. The system of claim 14, wherein the memory stores instructions to cause the processor to generate the semantic group generated by:

computing differences between each of a plurality of phrases generated by an automatic speech recognition engine, each of the plurality of phrases comprising a plurality of terms;

grouping the plurality of phrases by similarity;

identifying locations of differences between the plurality of phrases; and defining a generalized semantic group, the generalized semantic group comprising terms at the locations of the differences between the plurality of phrases.

16. The system of claim 14, wherein the second term corresponds to the semantic group comprising the plurality of terms.

17. The system of claim 10, wherein the suggested phrase is supplied as training data to a speech recognition system.

18. The system of claim 10, wherein the processor and memory are components of a speech analytics system.

19. The method of claim 1, wherein the analytics system is configured to performs classifications based on the plurality of categories by:

detecting a phrase of an interaction;

identifying a matching category of the plurality of categories, the matching category being associated with the phrase of the interaction; and categorizing the interaction as belonging to the matching category.

20. The method of claim 1, wherein adding the suggested phrase to the category that includes the supplied phrase comprises:

displaying the suggested phrase to a user as an alternate option for the supplied phrase;

receiving a user input accepting the suggested phrase as an alternate option; and in response to receiving the user input, adding the suggested phrase to the category that includes the supplied phrase.

21. The method of claim 6, wherein grouping the plurality of phrases by similarity comprises:

detecting each of the phrases a threshold number of times in a first context; and in response to the determination, grouping the plurality of phrases associated with a similar context.

* * * * *